United States Patent
Beckmann (10) Patent No.: US 10,961,925 B2
(45) Date of Patent: Mar. 30, 2021

(54) OPERATION OF AN INTERNAL COMBUSTION ENGINE WITH HIGH ALCOHOL CONTENT IN THE FUEL

(71) Applicant: CPT Group GmbH, Hannover (DE)

(72) Inventor: Reiner Otto Beckmann, Valinhos/SP (BR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 134 days.

(21) Appl. No.: 16/324,394

(22) PCT Filed: Aug. 7, 2017

(86) PCT No.: PCT/EP2017/069956
§ 371 (c)(1),
(2) Date: Feb. 8, 2019

(87) PCT Pub. No.: WO2018/029148
PCT Pub. Date: Feb. 15, 2018

(65) Prior Publication Data
US 2019/0178174 A1    Jun. 13, 2019

(30) Foreign Application Priority Data

Aug. 12, 2016  (DE) .................... 10 2016 215 116.9

(51) Int. Cl.
*F02D 41/06* (2006.01)
*F02D 41/24* (2006.01)
(Continued)

(52) U.S. Cl.
CPC ....... *F02D 41/0025* (2013.01); *F02D 19/084* (2013.01); *F02D 41/0002* (2013.01);
(Continued)

(58) Field of Classification Search
CPC .............. F02D 41/064; F02D 41/0002; F02D 41/0025; F02D 19/084; F02D 41/34; F02D 41/061; F02D 41/2409
(Continued)

(56) References Cited

U.S. PATENT DOCUMENTS 4,522,173 A * 6/1985 Agache .................... F02B 1/02
                                                        123/179.16
4,646,691 A    3/1987 Kiyota et al. ............ 123/179.16
(Continued)

FOREIGN PATENT DOCUMENTS

DE    25 36 432 A1    2/1977    .............. F02M 1/04
DE    43 29 448 A1    3/1995    ............. F02D 19/06
(Continued)

OTHER PUBLICATIONS

Google Translation of WO2010029261, Mar. 2010.*
(Continued)

*Primary Examiner* — Phutthiwat Wongwian
*Assistant Examiner* — Arnold Castro
(74) *Attorney, Agent, or Firm* — Slayden Grubert Beard PLLC (57) ABSTRACT

Various embodiments include a method for starting an internal combustion engine comprising: in a first phase after a starting process, setting a throttle valve to a value near to zero so the pressure in the intake tract is lowered below the ambient pressure and injecting a fuel into the intake tract above a rich combustion limit at which the fuel/air mixture would still just be combustible; in a second phase, reducing the fuel mass as a function of the pressure; in a third phase shorter than the second phase, further reducing the fuel mass and increasing the opening of the throttle valve to increase
(Continued)

the pressure in the intake tract; and in a fourth phase, increasing the fuel mass as a function of rising pressure in the intake tract.

9 Claims, 4 Drawing Sheets

(51) Int. Cl.
| | |
|---|---|
| *F02D 41/34* | (2006.01) |
| *F02D 33/02* | (2006.01) |
| *F02D 19/00* | (2006.01) |
| *F02D 19/08* | (2006.01) |
| *F02D 41/00* | (2006.01) |
| *F02N 19/00* | (2010.01) |

(52) U.S. Cl.
CPC ......... *F02D 41/061* (2013.01); *F02D 41/064* (2013.01); *F02D 41/34* (2013.01); *F02D 41/2409* (2013.01); *F02D 2200/021* (2013.01); *F02D 2200/0406* (2013.01); *F02D 2200/101* (2013.01); *F02D 2200/703* (2013.01); *F02N 2019/002* (2013.01); *Y02T 10/30* (2013.01); *Y02T 10/40* (2013.01)

(58) Field of Classification Search
USPC ......................................................... 123/490
See application file for complete search history.

(56) References Cited

U.S. PATENT DOCUMENTS

| | | | | |
|---|---|---|---|---|
| 4,911,116 | A | 3/1990 | Prohaska et al. ........ | 123/179.13 |
| 5,515,280 | A | 5/1996 | Suzuki ........................ | 701/29.2 |
| 5,605,138 | A | 2/1997 | Deichsel et al. .............. | 123/491 |
| 5,881,697 | A * | 3/1999 | Schott ................... | F02D 41/068 |
| | | | | 123/491 |
| 6,796,293 | B2 | 9/2004 | Bayerle et al. ............... | 123/491 |
| 2003/0150430 | A1* | 8/2003 | Bayerle .................. | F02N 11/08 |
| | | | | 123/491 |
| 2004/0221834 | A1 | 11/2004 | Miyamoto et al. ........... | 116/216 |
| 2006/0060162 | A1 | 3/2006 | Fukui et al. .............. | 123/179.16 |
| 2008/0228377 | A1 | 9/2008 | Hosokawa et al. ........... | 701/103 |
| 2010/0179743 | A1 | 7/2010 | Surnilla et al. ............... | 701/103 |
| 2010/0192920 | A1 | 8/2010 | Joly ............................. | 123/491 |
| 2011/0203552 | A1* | 8/2011 | Aso ..................... | F02D 41/0082 |
| | | | | 123/443 |
| 2011/0308500 | A1 | 12/2011 | Sato et al. .................... | 123/495 |
| 2013/0061833 | A1* | 3/2013 | Falkowski ............. | F02B 15/00 |
| | | | | 123/575 |
| 2013/0152903 | A1 | 6/2013 | Leone et al. ................. | 123/491 |
| 2013/0276756 | A1* | 10/2013 | Leone .................... | B60T 17/02 |
| | | | | 123/445 |
| 2013/0297182 | A1 | 11/2013 | Vincenzi et al. ............. | 701/103 |
| 2014/0297159 | A1* | 10/2014 | Surnilla ................ | F02D 41/061 |
| | | | | 701/103 |
| 2014/0297162 | A1* | 10/2014 | Surnilla ................ | F02D 41/065 |
| | | | | 701/104 |

FOREIGN PATENT DOCUMENTS

| | | | | |
|---|---|---|---|---|
| DE | 103 51 206 A1 | 6/2005 | ........... | F02M 31/125 |
| DE | 10 2007 029 478 A1 | 1/2009 | ............ | F02D 41/06 |
| DE | 10 2008 042 514 A1 | 4/2010 | ............ | F02N 99/00 |
| DE | 10 2012 206 882 A1 | 7/2013 | ............ | F02D 41/30 |
| FR | 2 936 018 A1 | 3/2010 | ............ | F02D 41/06 |
| JP | S 57-52665 A | 3/1982 | ............ | F02D 19/06 |
| KR | 20020093864 A | 12/2002 | ............ | F02N 11/04 |
| WO | 2010029261 | * 3/2010 | ............ | F02D 41/06 |
| WO | 2018/029148 A1 | 2/2018 | ............ | F02D 19/08 |

OTHER PUBLICATIONS

Korean Office Action, Application No. 2020009506435, 5 pages, dated Feb. 7, 2020.
Swedish Office Action, Application No. 1950227-7, 8 pages, dated Oct. 2, 2019.
German Office Action, Application No. 10 2016 215 116.9, 5 pages, dated Feb. 1, 2017.
International Search Report and Written Opinion, Application No. PCT/EP2017/069956, 15 pages, dated Dec. 18, 2017.

* cited by examiner

OPERATION OF AN INTERNAL COMBUSTION ENGINE WITH HIGH ALCOHOL CONTENT IN THE FUEL

CROSS-REFERENCE TO RELATED APPLICATIONS

This application is a U.S. National Stage Application of International Application No. PCT/EP2017/069956 filed Aug. 7, 2017, which designates the United States of America, and claims priority to DE Application No. 10 2016 215 116.9 filed Aug. 12, 2016, the contents of which are hereby incorporated by reference in their entirety.

BACKGROUND

The present disclosure relates to internal combustion engines. Various embodiments may include methods and/or devices for starting an internal combustion engine, wherein the internal combustion engine is supplied with a fuel which has a high alcohol content.

BACKGROUND

Some vehicles can be operated both with alcohol or alcohol mixed fuels, i.e. with fuels with variable alcohol contents as well as with gasoline as the only fuel component. The alcohol, e.g. methanol or ethanol in the fuel can be present here in different proportions in the range from 0 to 100%. Such fuels are also referred to as "flex fuel" or "flexible fuel" (FF) and the motor vehicles which can be operated therewith are referred to as flexible fuel vehicles (FFV). A customary alcohol/gasoline mixture in Europe and the USA is for example E85, i.e. 85% ethanol in the fuel, in which the gasoline content is consequently 15%. In many countries, the ethanol content in the fuel is lowered in the winter months, e.g. to 75%. In Brazil, E100, that is to say pure ethanol, is also provided as a fuel for operating internal combustion engines in vehicles. Wherever reference is made below to E100 as a fuel, it is to be borne in mind that as a rule such a fuel can contain 5-7% of water.

Flex-fuel vehicles therefore provide the possibility of refuelling both with conventional gasoline and with these ethanol mixed fuels, since the current gasoline/ethanol concentration in the fuel is detected by means of an alcohol sensor or by means of a model calculation in the electronic engine controller and corresponding parameters for controlling the internal combustion engine are adapted. The use of such mixed fuels with a high ethanol content has a corresponding disadvantage that in the case of low temperatures the vehicle can only be started with difficulty, since ethanol has a relatively high boiling point (78° C.) and a low vapor pressure, that is to say vaporizes very poorly at low temperatures. As a result of the addition of ethanol, the overall proportion of highly volatile fuel contents is reduced, which adversely affects the cold starting capability. The minimum starting temperature without additional cold starting systems is approximately −20° C. when E85 fuel is used and approximately +15° C. when E100 fuel is used.

Since cold starting problems therefore occur unless special provisions are made, in vehicles which permit operation with up to 100% ethanol as a fuel (E100), small permanently installed additional fuel containers which contain a small quantity of starting fuel, e.g. gasoline, are carried along in the engine compartment. This starting fuel is then used to start the vehicle below certain external temperatures, or said starting fuel is injected at a central point in the intake manifold, in addition to the ethanol so that a combustible fuel/air mixture is produced.

However, the cold starting system is rarely required and only small quantities of starting fuel are extracted from the additional container, and in the course of time said starting fuel increasingly degrades. In this context, the term "degrades" is understood to mean that the highly volatile hydrocarbon contents such as propane and butane easily vaporize and escape from the additional container as a result of the high temperatures in the engine compartment while the internal combustion engine is operating, and therefore of the vehicle, and as a result of the severe shaking of the vehicle during operation. The components which are necessary for a cold start are then lost or at least considerably reduced. In certain circumstances, it is then no longer possible to carry out a cold start. Furthermore, such a system with a separate tank is costly in terms of maintenance and constitutes a potential hazard owing to its accommodation in the engine compartment (crash zone).

Documents U.S. Pat. Nos. 4,911,116 A and 4,646,691 A describe fuel systems for internal combustion engines of a motor vehicle which are operated with alcohol and have separate cold starting tanks which contain gasoline which is used for starting the engine.

Subsequently, if the engine has been started and begins to become warm, instead of the cold starting fuel the main tank with the fuel containing alcohol is connected. Both tanks require separate filling, i.e. feed lines to the outside of the vehicle body and separate fuel tank flaps. The driver must also keep an eye on the fuel level in both tanks in order to be able to refill them in good time. Furthermore, the driver must differentiate between two separate fuel tank connectors, which, if not done properly, can result in incorrect filling of the two tanks.

DE-OS 25 36 432 discloses an internal combustion engine which can be operated with alcohol and alcohol mixed fuels, and in which a cold starting device with an electrically operated heating device is provided in a secondary intake duct which bypasses a main mixture-forming device. The necessary air for the cold starting mixture is branched off from the main air intake duct, wherein the flow connection can be interrupted by a shut-off device. The starting ability of the internal combustion engine at low ambient temperatures is improved by heating the fuel/air mixture.

JP-A-52 665/1982 describes a heating device for heating an inlet line, wherein the heating device is controlled in accordance with the output of an alcohol concentration sensor, and in which document the heat generation quantity of the heating device becomes larger if the alcohol concentration assumes a reference value or is higher than said value.

DE 103 51 206 A1 describes an injection valve, in particular for injecting fuel into the intake duct of internal combustion engines in vehicles. Said injection valve has a valve housing with an injection opening, a fuel inflow duct and a heating module which is fitted onto the valve housing, onto its end facing away from the injection opening, with a module housing which is attached to the valve housing and a heating element which heats the fuel flowing through the module housing. As a result, even when there is a cold start of the internal combustion engine the fuel is brought quickly to the setpoint temperature of e.g. 80° C. which is necessary for very good atomization. During the injection, under these conditions what is referred to as the flash boiling effect can occur, during which the fuel vaporizes spontaneously and is atomized to an optimum degree.

Instead of heating each individual injection valve electrically, it is also known to heat the fuel distributor switch to which the injection valves are connected. Furthermore, it is known to equip such flex-fuel vehicles with a cold starting system in the form of an electrical engine block heater which is connected via cables and conventional sockets to the 110V or 220V power supply. Such external heating devices which are generally referred to as block heaters serve to heat a coolant of the internal combustion engine at very low ambient temperatures and therefore are intended to facilitate the starting of the internal combustion engine. Cold starting devices using such fuel pre-heating systems are comparatively expensive to manufacture, and the engine starting process cannot take place until after a certain time which is necessary to pre-heat the fuel.

Furthermore, large amounts of unburnt fuel enter the engine oil at the cold start and subsequent warming up, which has an adverse effect on the viscosity of the engine oil and therefore the mechanical durability of certain engine components. At relatively high engine oil temperatures, the boiling point of ethanol causes a large quantity of fuel to suddenly vaporize out of the engine oil, which fuel is fed to the combustion and greatly enrich or over-enrich the combustion mixture.

SUMMARY

The teachings of the present disclosure describe methods and corresponding devices for starting an internal combustion engine which can be reliably started even when there are very high alcohol contents in the fuel and even at low temperatures. For example, some embodiments include a method for starting an internal combustion engine (1) which is configured for operation with alcohol or alcohol/gasoline mixed fuels, wherein the internal combustion engine (1) has an intake tract (4) with a throttle valve (8) which is arranged therein and has the purpose of setting the combustion air, and the method is divided into a plurality of chronologically successive phases (Ph1-Ph4), wherein in a first phase (Ph1) starting immediately after the activation of the starting process (t=0) of the internal combustion engine (1) a degree of opening (TPS_ST) of the throttle valve (8) is set to a value near to zero or equal to zero, with the result that the pressure (MAP) in the intake tract (4) is lowered to a value below the ambient pressure (AMP), a fuel mass (MFF_ST) is injected into the intake tract (4), the value of which fuel mass (MFF_ST) is above a rich combustion limit at which the fuel/air mixture would still just be combustible, in a second phase (Ph2) the fuel mass (MFF_ST) is reduced in relation to the decreasing pressure (MAP) in the intake tract (4), in a third phase (Ph3) which is chronologically shorter compared with the second phase (Ph2) the fuel mass (MFF_ST) is reduced further, the degree of opening (TPS_ST) of the throttle valve (8) is increased, with the result that the pressure (MAP) in the intake tract (4) rises again, and in a fourth phase (Ph4) the fuel mass (MFF_ST) is increased as a function of the rising pressure (MAP) in the intake tract (4).

In some embodiments, the value for the fuel mass (MFF_ST) is formed from a basic value (MFF_ST_BAS) which is stored in a characteristic diagram (KF1) as a function of the coolant temperature (TCO) of the internal combustion engine (1) and the rotational speed (N) of the internal combustion engine (1) and which is corrected at least with a correction factor (MFF_ST_FAC_DEAC, MFF_ST_FAC_MAP, MFF_ST_FAC_CYC).

In some embodiments, a first correction factor (MFF_ST_FAC_DEAC) is formed as a function of the number of cylinder working cycles (CYC_1) since the actuation of the starting process or the number of cylinder working cycles (CYC_2) from the time of the first injection at the start and the coolant temperature (TCO) of the internal combustion engine (1) and is stored in a characteristic diagram (KF1).

In some embodiments, a second correction factor (MFF_ST_FAC_MAP) is formed as a function of the ambient pressure (AMP) and the pressure (MAP) in the intake tract (4) and is stored in a characteristic diagram (KF3).

In some embodiments, a third correction factor (MFF_ST_FAC_CYC) is formed as a function of the number of cylinder working cycles (CYC_1) since the actuation of the starting process or the number of cylinder working cycles (CYC_2) from the time of the first injection at the start and the rotational speed (N) of the internal combustion engine (1) and is stored in a characteristic diagram (KF4).

In some embodiments, the value for the degree of opening (TPS_ST) of the throttle valve (8) is formed from a basic value (TPS_ST_BAS) which is stored in a characteristic diagram (KF5) as a function of the coolant temperature (TCO) of the internal combustion engine (1) and the rotational speed (N) of the internal combustion engine (1) and which is corrected at least with a correction factor (TPS_ST_FAC_CYC, TPS_ST_FAC_x,y).

In some embodiments, a first correction factor (TPS_ST_FAC_CYC) is formed as a function of the number of cylinder working cycles (CYC_1) since the actuation of the starting process or the number of cylinder working cycles (CYC_2) from the time of the first injection at the start and the coolant temperature (TCO) of the internal combustion engine (1) and is stored in a characteristic diagram (KF6).

In some embodiments, a second correction factor (TPS_ST_FAC_x,y) is formed as a function of the number of cylinder working cycles (CYC_1) since the actuation of the starting process or the number of cylinder working cycles (CYC_2) from the time of the first injection at the start, the coolant temperature (TCO) of the internal combustion engine (1) and the rotational speed (N_MOD) obtained by means of a model, and is stored in a characteristic diagram (KF7).

In some embodiments, a fuel which contains at least 75% ethanol, in particular 100% ethanol, is used as the fuel.

As another example, some embodiments include a device for starting an internal combustion engine (1) which is configured for operation with alcohol or alcohol/gasoline mixed fuels, wherein the internal combustion engine (1) has an intake tract (4) with a throttle valve (8) which is arranged therein and has the purpose of setting the combustion air and which is designed to carry out a method as described above.

BRIEF DESCRIPTION OF THE DRAWINGS

Further embodiments and advantages of the teachings herein emerge from the description of an exemplary embodiment which is explained in more detail below with reference to the schematic drawing, in which.

DETAILED DESCRIPTION

In some embodiments, an internal combustion engine has an intake tract with a throttle valve which is arranged therein and has the purpose of setting the combustion air. A method for its operation is divided into a plurality of chronologically successive phases, wherein in a first phase starting immediately after the activation of the starting process of the internal combustion engine a degree of opening of the throttle valve is set to a value near to zero or equal to zero, with the result that the pressure in the intake tract is lowered to a value below the ambient pressure, a fuel mass is injected into the intake tract, the value of which fuel mass is above a rich combustion limit at which the fuel/air mixture would still just be combustible, in a second phase the fuel mass is reduced in relation to the decreasing pressure in the intake tract, in a third phase which is chronologically shorter compared with the second phase the fuel mass is reduced further, the degree of opening of the throttle valve is increased, with the result that the pressure in the intake tract rises again, in a fourth phase the fuel mass is increased as a function of the rising pressure in the intake tract.

The methods described herein and the corresponding devices permit a combustion process and therefore starting of an internal combustion engine to be carried out even at low temperatures, even if a fuel with a very high ethanol content, up to E100 is used as the fuel. In order to carry out reliable starting of the internal combustion engine, basic values are evaluated for the fuel mass to be injected and for the degree of opening of the throttle valve with correction factors which take into account the wide variety of influencing variables during the starting process. The values for the coolant temperature of the internal combustion engine, the rotational speed of the internal combustion engine, the ambient pressure, the pressure in the intake tract, the number of working cycles since the beginning of the starting process, or the number of working cycles during the starting process with fuel injection are thus continuously acquired, and for this purpose the corresponding correction factors in characteristic diagrams of the control device are read out. This results in particularly precise control of the internal combustion engine when starting occurs.

In some embodiments, the components, such as additional tanks for a starting fuel or fuel pre-heaters of any type, which are necessary in conventional cold starting systems for such internal combustion engines which are operated with mixed fuels or pure alcohol can be dispensed with. Since it is not necessary to wait for any time period until such heating devices bring the fuel to a temperature at which the fuel reliably burns, the starting process can begin without a waiting time.

Figure 1:
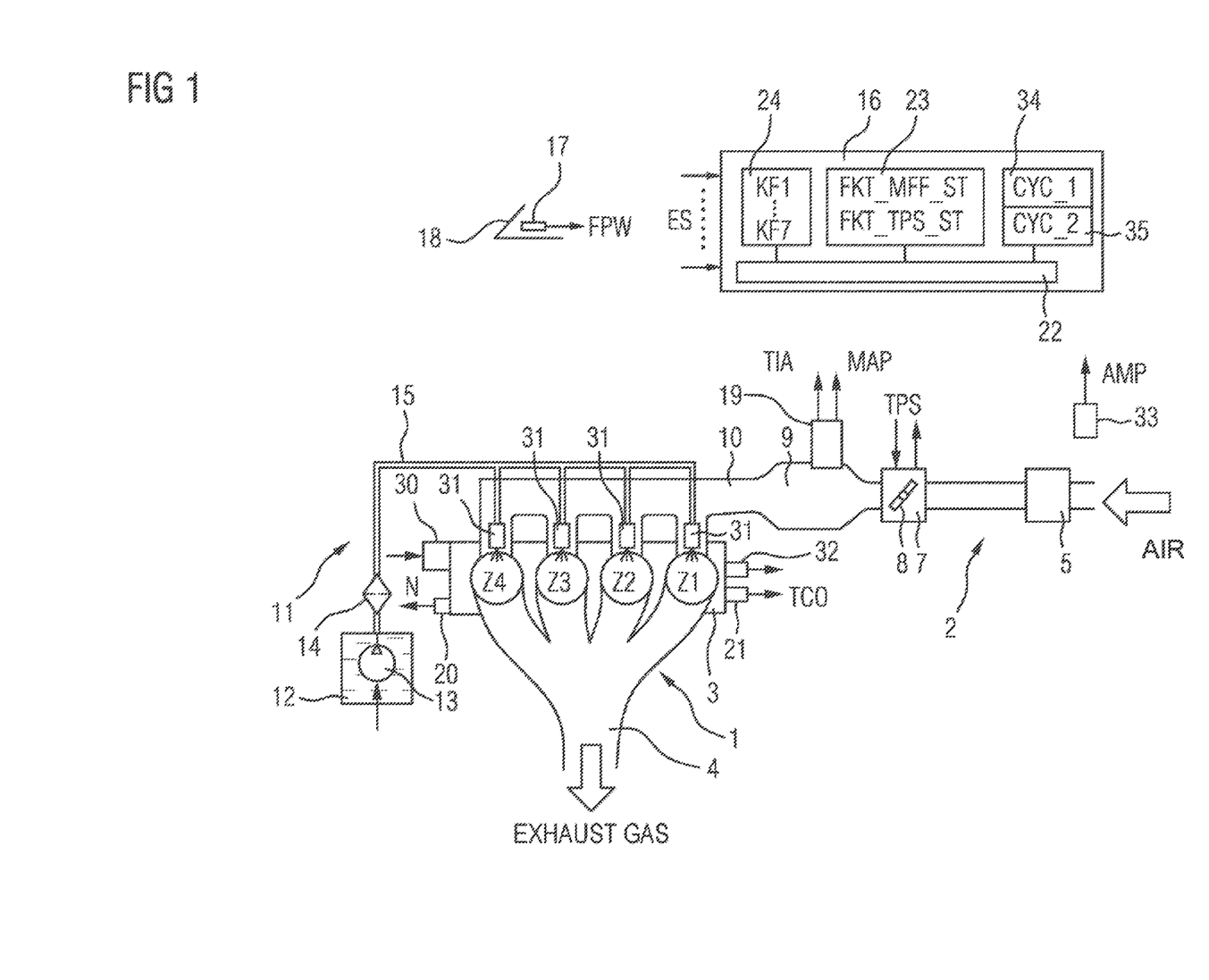
FIG. 1 shows a schematic illustration of an internal combustion engine which can be operated with a high ethanol content in the fuel and has an associated control device.

FIG. 1 shows a schematic illustration of a multi-cylinder internal combustion engine 1, which can be operated with a high ethanol content in the fuel, in particular with pure ethanol as fuel (E100), and which has external mixture formation. In this context, only the components which are necessary to understand the invention are illustrated. In particular, the ignition device which is necessary to ignite the fuel/air mixture and the exhaust gas after-treatment system which is present in the exhaust tract have not been illustrated.

The term external mixture formation is used in the context of a spark ignition engine if the fuel is introduced (fed in advance) into the intake manifold, e.g. in the direction of the gas inlet valve, and therefore the fuel/air mixture is formed outside the combustion chamber. This is also referred to as duct injection.

The internal combustion engine 1 has an intake tract 2, an engine block with 4 cylinders Z1 to Z4 and a cylinder head 3, as well as an exhaust tract 4.

Fresh air which is required to burn the fuel is fed to the internal combustion engine 1 via the intake tract 2. In the intake tract 2 there are provided, viewed in the direction of flow of the sucked-in air (indicated arrow symbol) an air filter 5 and a throttle valve block 7 with a throttle valve 8 and a throttle valve sensor (not denoted in more detail) for sensing the degree of opening TPS of the throttle valve 8. The throttle valve 8 is embodied as an electromotively actuable throttle valve (E-GAS), the degree of opening TPS of which can be set both by activation by the driver (driver's request) and using signals of an electronic control device 16 which performs open-loop and closed-loop control of the internal combustion engine 1.

The intake tract 1 also comprises a collector 9 which opens into an intake manifold 10 which is common to all the cylinders Z1 to Z4. This intake manifold 10 branches in the vicinity of the cylinders Z1 to Z4 in such a way that an inlet duct (not denoted in more detail) leads to each cylinder Z1 to Z4. A fuel injector is arranged in each of the inlet ducts. As a result, when necessary, fuel from the fuel injectors 31 can be fed in advance to the corresponding cylinders Z1 to Z4, and, after the opening of the gas inlet valves (not illustrated) which are assigned to the cylinders Z1 to Z4, the fuel/air mixture can flow into the cylinders Z1 to Z4.

Provided in the collector 9 is a sensor module 19 which comprises both an intake manifold pressure sensor and a temperature sensor. The intake manifold pressure sensor serves as a load sensor and outputs a signal MAP (manifold air pressure) which represents the intake manifold pressure. The temperature sensor outputs signal TIA (temperature intake air) which represents the temperature in the collector 9. Instead of a sensor module 19 which contains both sensors, separate sensors for the intake manifold pressure MAP and the temperature TIA can also be present in the collector 9 and/or in the intake manifold.

A fuel supply device 11 is also assigned to the internal combustion engine 1. The fuel is fed here from a fuel tank 12 by an electric fuel pump 13 which is generally arranged inside the fuel tank 12 (in-tank pump) into a fuel line 15 which contains a fuel filter 14 and is common to all the fuel injectors 31. The fuel line 15 branches in the vicinity of the cylinder head 3 to form individual feed lines (not denoted in more detail in the figure) so that each fuel injector 31 of each cylinder Z1 to Z4 can be supplied with fuel.

The exhaust gases which are produced during the combustion are expelled into the exhaust tract 4 by opening gas outlet valves and said exhaust gases pass into the surroundings by means of one or more exhaust gas catalytic converters of a known design and a silencer after purification.

In order to start the internal combustion engine 1 an electric starting device 30 is provided which can comprise a conventional starter or a starter generator (belt-type starter generator or crankshaft-type starter generator).

The electronic control device 16 is assigned sensors which acquire various measurement variables and determine in each case the measured value of the measurement variable. The control device 16 determines, as a function of at least one of the measurement variables, manipulated variables which are then converted into one or more actuation signals for controlling the actuators by means of corresponding actuator drives.

The sensors may include, inter alia, an accelerator pedal position encoder 17 which senses the position of an accelerator pedal 18 and outputs a corresponding signal FPW (accelerator pedal value), the sensor module 19, a crankshaft angle sensor 20 which acquires a crankshaft angle to which a rotational speed N is then assigned, a camshaft sensor 32 which outputs a signal corresponding to the position of a camshaft of the internal combustion engine 1, a temperature sensor 21 which acquires a coolant temperature TCO of the internal combustion engine 1, and/or a pressure sensor 33 which acquires the ambient pressure AMP. Depending on the embodiment of the invention, any desired subset of the specified sensors or even additional sensors may be present, the signals of which are indicated generally by the reference symbol ES in FIG. 1.

In some embodiments, the actuators may include, for example, the throttle valve 8, the fuel injectors 31, the electric fuel pump 13, the starting device 30, spark plugs, etc. Further signals for further actuators which are necessary to operate the internal combustion engine 1, but not explicitly illustrated, are characterized generally by the reference symbol AS in FIG. 1.

Figure 3:
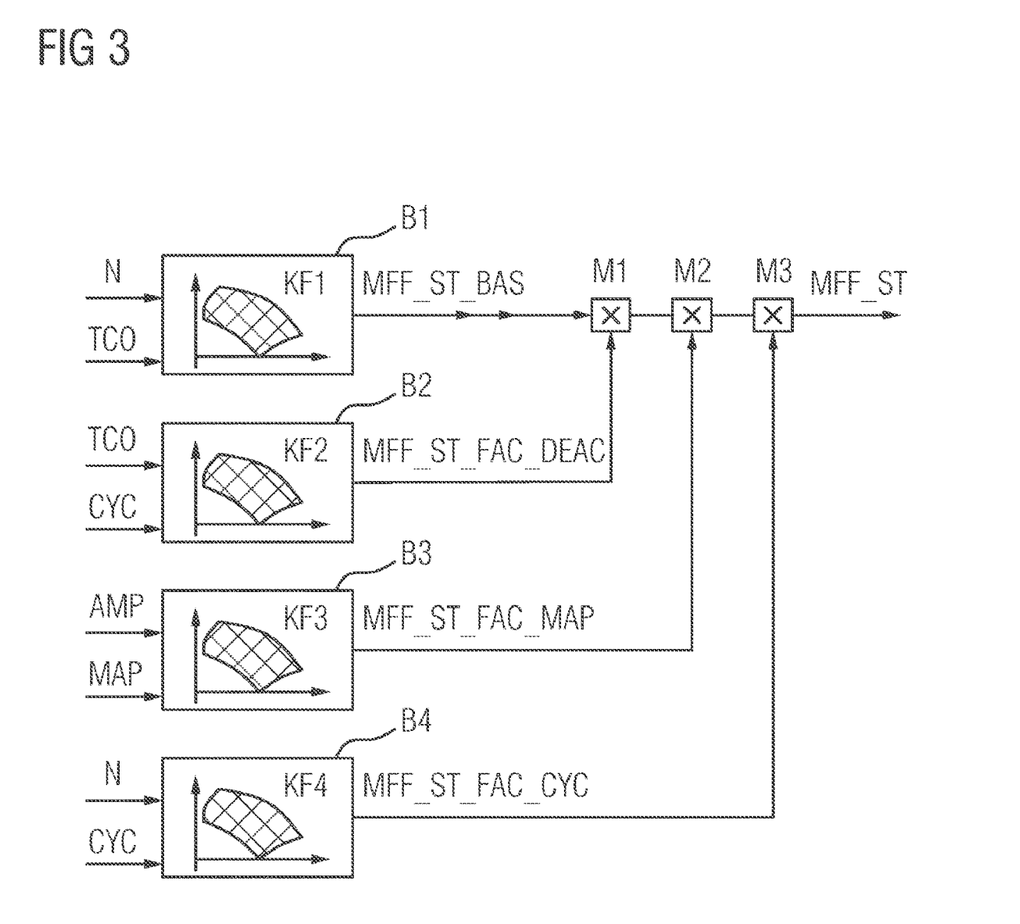
FIG. 3 shows a block diagram relating to the calculation of the fuel mass during the cold start of the internal combustion engine.
Figure 4:
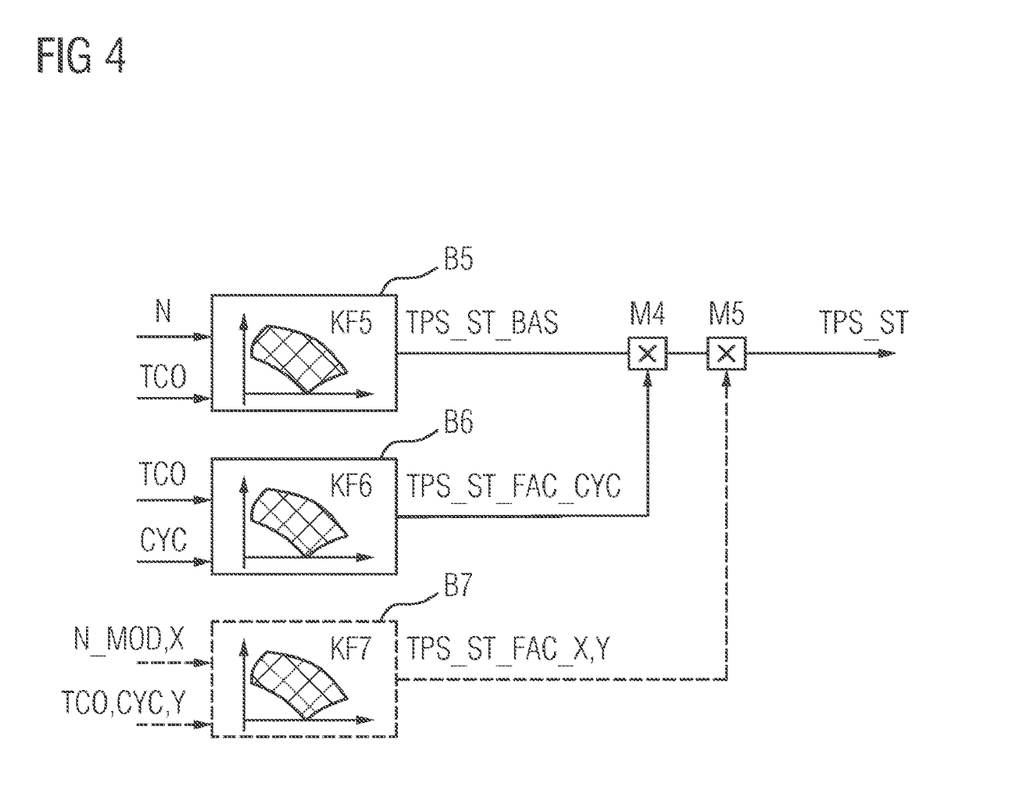
FIG. 4 shows a block diagram relating to the calculation of the throttle valve setpoint value during the cold start of the internal combustion engine.

The electronic control device 16 corresponds to a device for controlling the internal combustion engine 1 and can also be referred to as an engine control unit. Such control devices 16, which generally contain one or more microprocessors. In some embodiments, the control device 16 comprises a computational unit (processor) 22, which is coupled to a program memory 23 and a value memory (data memory) 24. The program memory 23 and the value memory 24 contain programs or values which are required for the operation of the internal combustion engine 1. In particular, a control method with subroutines FKT_MFF_ST, FKT_TPS_ST, with which control method the internal combustion engine 1 can be reliably started even in the case of very high ethanol contents in the fuel (up to E100) and at low temperatures, is implemented in the program memory 23. A plurality of characteristic diagrams KF1 to KF7, whose meanings are explained in more detail with reference to the description of FIGS. 2 to 4, are stored in the data memory 24.

In some embodiments, the control device 16 includes a cycle counter 34 which sums the number CYC_1 of the cylinder working cycles of the internal combustion engine 1 since the starting process was activated. A further cycle counter 35 sums the number CYC_2 of the cylinder working cycles at the start, at which working cycles an injection takes place. The function of these cycle counters 34, 35 is explained in more detail with reference to the description of FIGS. 3 and 4.

Figure 2A:
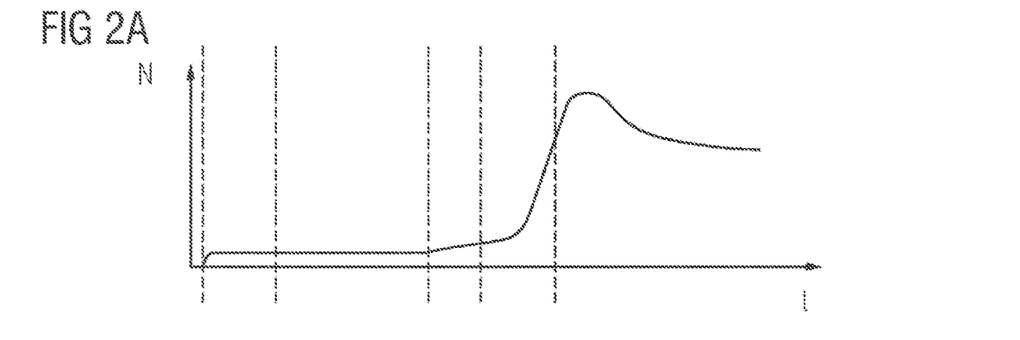
FIGS. 2A-2D show diagrams of parameters for controlling the internal combustion engine during the cold start.
Figure 2B:
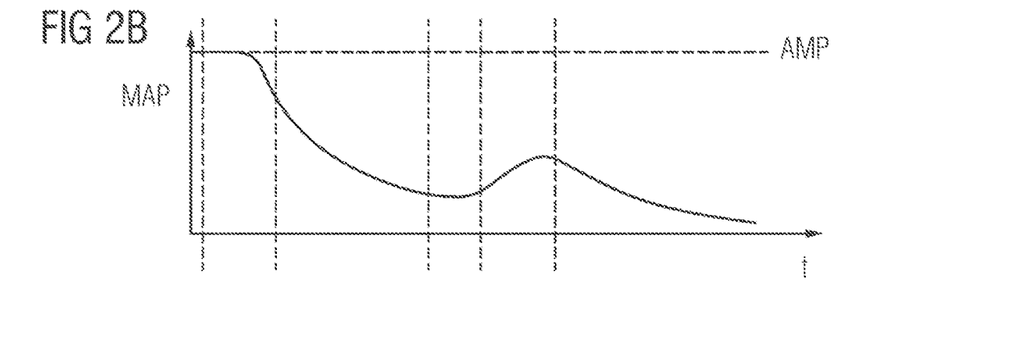
Figure 2C:
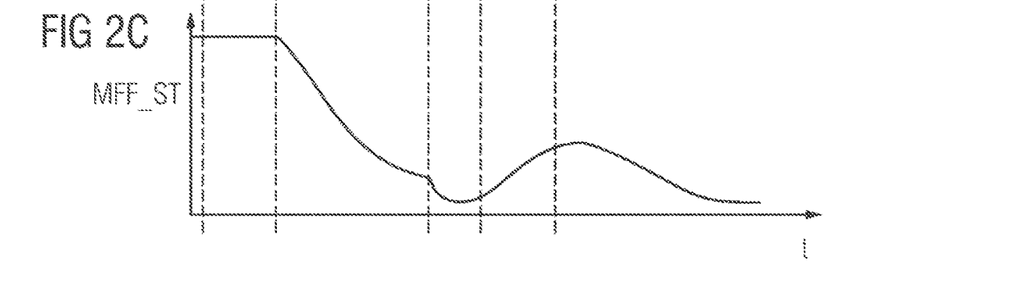
Figure 2D:
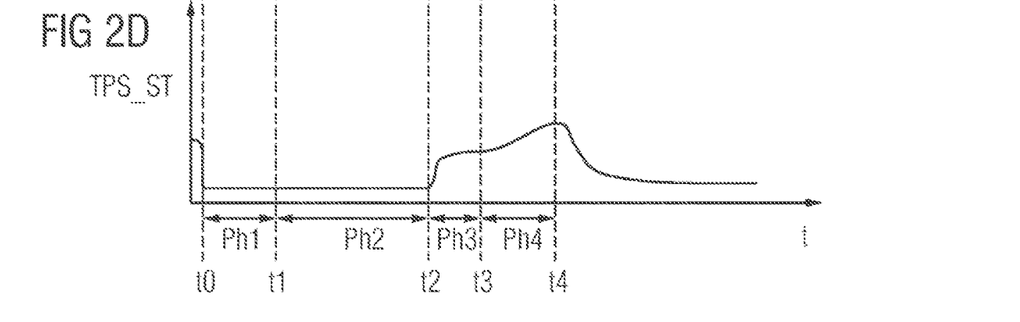

FIGS. 2A to 2D illustrate in a purely qualitative fashion the time profiles of system variables during a cold start of the internal combustion engine 1. FIG. 2A shows the profile of the rotational speed N of the internal combustion engine 1, FIG. 2B shows the pressure MAP in the intake tract 2, FIG. 2C shows the fuel mass MFF_ST, and FIG. 2D shows the degree of opening TPS_ST of the throttle valve 8.

As is illustrated in FIG. 2, the starting process of the internal combustion engine 1 is divided, in chronological terms, into a plurality of successive sections which comprise the phases Ph1 to Ph4. Before a time t0 of a starting process of the internal combustion engine 1, the starting device 30, that is to say a starter or starter generator, is not yet activated and the pressure in the intake tract MAP of the internal combustion engine 1 is equal to the ambient pressure AMP (FIG. 2B).

In a first section of the starting process of the internal combustion engine, which section comprises the phases Ph1 and Ph2, the pressure MAP in the intake tract 4 must be lowered in order to reduce the boiling point of the fuel (FIG. 2B). The crankshaft of the internal combustion engine 1 is made to rotate by the activation of the starting device 30 at the time t0. As a result of the setting of the degree of opening TPS_ST of the throttle valve 8 during the starting process to a low starting value, in particular it is placed in a closed position, volume is sucked in from the intake tract 4 downstream of the throttle valve 8 as a result of the movement of the piston into the cylinders Z1 to Z4. When the throttle valve 8 is closed, no volume or only a small volume (leakage air of the throttle valve 8) can continue to be fed in comparison with the sucked-in volume as a result of the piston movement. In the intake tract 4 downstream of the throttle valve 8, an intake manifold pressure MAP which is relatively low in comparison with the ambient pressure AMP is brought about. This lowering of the intake manifold pressure MAP brings about the reduction in the boiling temperature of the fuel. At the same time, when the starting device 30 activates, the cycle counter 34 in the control device 16 is also started.

In the first phase Ph1 of the starting process, which phase comprises the time period t1-t0, a mass of fuel which is above the rich combustion limit must be injected. The rich combustion limit is understood here to be an air/fuel ratio at which the mixture would just still be combustible. Therefore, more fuel is injected and this excess metering (over-enrichment) brings about the reduction in the friction of the moved pistons and the piston rings at the cylinder walls and increases the rotational speed N during the starting process, which accelerates the lowering of the pressure MAP in the intake tract 4. On the other hand, it brings about an accumulation of unburnt fuel in the intake tract 4 and in the combustion chambers of the cylinders Z1-Z4 of the internal combustion engine 1, which is important for the first combustion process in the further sequence.

In a second phase Ph2 of the starting process, which phase comprises the time period t2-t1, the fuel mass MFF_ST has to be reduced, in relation to the falling pressure MAP in the intake tract, in such a way that a first combustion can occur (FIG. 2D). A first combustion can occur only if the ratio of the fuel mass MFF_ST, the boiling point of the fuel, the sucked-in air mass and the combustion chamber temperature are within the combustion limit for this fuel/air mixture. The calculation of the fuel mass MFF_ST during the starting process of the internal combustion engine is influenced in a reducing and increasing fashion as a function of the intake manifold pressure MAP. The control of the fuel mass MFF_ST is implemented by means of a function FKT_MFF_ST in the control device 16, as will be explained in more detail with reference to FIG. 3.

As a result of the input of heat of the first combustion per cylinder into the combustion chambers, the fuel mass MFF_ST for the second and further combustion per cylinder must firstly be significantly lowered. This takes place during the phase Ph3, which comprises the time period t3-t2 (FIG. 2C). This influencing of the mixture during the starting process of the internal combustion engine 1 also performs the function FKT_MFF_ST implemented in the control device 16, with the result that a rotational-speed-dependent and a combustion-cycle-dependent/working-cycle-dependent possibility of influencing the fuel mass can be carried out. Instead of a combustion-cycle-dependent/working-cycle-dependent possibility it is also possible to use a rotational speed gradient or a modelled rotational speed N. This is also implemented by means of suitable functional representations in the control device 16, as will be explained in more detail.

In parallel with the first combustions, the pressure MAP in the intake tract 4 may be increased again in such a way that the torque which can be generated overcomes the existing frictional torques of the internal combustion engine 1, and the internal combustion engine 1 can start under its own power. The setpoint value for the degree of opening TPS_ST of the throttle valve 8 is therefore greatly increased in the phase Ph3 (FIG. 2D). This inferencing of the pressure MAP in the intake tract during the starting of the internal combustion engine 1 is implemented by means of a function FKT_TSP_ST in the control device 16, as will be explained in more detail with reference to FIG. 4. As a result, a rotational-speed-dependent and a combustion-cycle-dependent/working-cycle-dependent possibility of influencing the setpoint value of the degree of opening TPS_ST of the throttle valve 8 is obtained. Instead of or in addition to a combustion-cycle-dependent/working-cycle-dependent possibility it is also possible to use a rotational speed gradient or a modelled rotational speed. This is also implemented by means of the function FKT_TSP_ST.

In the subsequent phase Ph4 of the starting process, which phase comprises the time period t4-t3, the fuel mass MFF_ST has to be increased as a function of the rising intake manifold pressure MAP in such way that the ratio of the fuel mass MFF_ST, boiling point of the fuel, sucked-in air mass and the combustion chamber temperature are within the combustion limit of the fuel/air mixture. This is implemented by means of the functional representation FKT_MFF_ST in the control device 16. The pressure MAP in the intake tract 4 must be increased quickly at first but continuously and then slowly. In this context, the pressure MAP in the intake tract 4 must not rise too high, since otherwise the combustion process is impeded or even interrupted.

At the time t4, the starting process of the internal combustion engine 1 is ended and the open-loop and closed-loop control of the internal combustion engine 1 takes place in a conventional fashion.

FIG. 3 shows a block illustration of the function FKT_MFF_ST for calculating the fuel mass MFF_ST to be injected, at the start of the internal combustion engine 1. In a function block B1, a basic injection time MFF_ST_BAS is determined by means of a characteristic diagram KF1, which has as input variables the rotational speed N of the internal combustion engine 1 and the coolant temperature TCO of the internal combustion engine 1. The value for the rotational speed N is obtained in a conventional way from the signal of the crankshaft angle sensor 20, and the value for the coolant temperature TCO is obtained from the signal of the coolant temperature sensor 21

In a function block B2, a correction factor MFF_ST_FAC_DEAC is determined by means of a characteristic diagram KF2, which has as input variables the number of cylinder working cycles (cycles) CYC of the internal combustion engine 1 from the time when the starting device 30 is energized (time t0 in FIG. 2) or else from the time of the first injection during the starting and the coolant temperature TCO of the internal combustion engine 1.

The number of cylinder working cycles (cycles) CYC is determined on the basis of the signals of the crankshaft angle sensor 20 and of the camshaft sensor 32. If the crankshaft of the internal combustion engine 1 rotates and the synchronization between the two sensors 20, 32 is concluded, this information is obtained using a crankshaft encoder wheel (generally a 60-2 teeth wheel). In the case of a 4-stroke internal combustion engine 1, a working cycle comprises two revolutions of the crankshaft (CW), that is to say 720° CW. If the internal combustion engine 1 has, as in the example shown in FIG. 1, 4 cylinders, these 720° CW are divided into four segments of 180° CW each, wherein each segment is assigned to one cylinder. This is referred to here as a cylinder working cycle CYC. The counter reading of the cycle counter 34 is therefore increased by the value 1 every 180° CW.

The correction factor MFF_ST_FAC_DEAC in the block B2 takes into account the case in which the internal combustion engine 1 should, for whatever reason, not start because e.g. there is a fault in the ignition device or the intake tract is blocked, and therefore too little combustion air is fed in, with the result that combustion of the fuel/air mixture cannot be initiated in the cylinders. So that the internal combustion engine 1 does not suffer any damage as a result of this, after a predefined limiting value for the counter reading of the cylinder working cycles CYC has been reached the fuel is reduced. The correction factor MFF_ST_FAC_DEAC therefore lies between the values 1 and 0. At the beginning of the starting of the internal combustion engine 1 (t0 in FIG. 2), the value is equal to 1, and after the aforementioned limiting value has been reached it is continuously reduced, in the worst case to the value equal to zero.

In a function block B3, a correction factor MFF_ST_FAC_MAP is determined by means of a characteristic diagram KF3, which has as input variables the pressure AMP in the intake tract 4 of the internal combustion engine 1 and the ambient pressure MAP.

In a function block B4, a correction factor MFF_ST_FAC_CYC is determined by means of a characteristic diagram KF4, which has as input variables the rotational speed N of the internal combustion engine 1 and the number of working cycles (cycles) CYC of the internal combustion engine 1 from the time when the starting device 30 is activated (time t0 in FIG. 2) or else from the time of the first injection during the starting.

The basic injection time MFF_ST_BAS obtained in the block 1 is multiplicatively corrected by means of multiplication points M1, M2 and M3 with the three correction factors MFF_ST_FAC_DEAC, MFF_ST_FAC_MAP, MFF_ST_FAC_CYC, with the result that at the end of the correction procedure a value is available for the fuel mass MFF_ST to be injected at the starting of the internal combustion engine 1.

FIG. 4 shows a block illustration of the function FKT_TPS_ST for calculating the throttle valve setpoint value TPS_ST at the starting of the internal combustion engine 1. In a function block B5, a basic throttle valve setpoint value TPS_BAS is determined by means of a characteristic diagram KF5, which has as input variables the rotational speed N of the internal combustion engine 1 and the coolant temperature TCO of the internal combustion engine 1. For the input variables of the rotational speed N and the coolant temperature TCO the corresponding procedure within the scope of the description of the block B1 in FIG. 3 applies.

In a function block B6, a correction factor TPS_ST_FAC_CYC is determined by means of a characteristic diagram KF6, which has as input variables the number of working cycles (cycles) CYC of the internal combustion engine 1 from the time when the starting device 30 is energized (time t0 in FIG. 2) or else from the time of the first injection during the starting and the coolant temperature TCO of the internal combustion engine 1.

For the input variables of the number of working cycles CYC and the coolant temperature TCO the corresponding procedure within the scope of the description of the block B2 in FIG. 3 applies. The basic throttle valve setpoint value TPS_ST_BAS obtained in the block B5 is fed to a multiplication point M4, where the correction factor TPS_ST_FAC_CYC is multiplicatively applied to it. Alternatively, the correction can also take place additively.

A further function block B7 can be optionally provided, as is shown in the illustration with dashed lines in FIG. 4. This function block B7 includes a characteristic diagram KF7 which has as input variables further influencing variables x, y for determining the throttle valve setpoint value TPS_ST at the starting of the internal combustion engine 1. In particular, the variable x can be a modelled rotational speed N_MOD which is obtained by means of a computational model. The rotational speed fluctuates greatly at the starting of the internal combustion engine 1 because the first combustions fluctuate greatly. The crankshaft angle sensor 20 does not supply a rotational speed value until a working cycle has passed. At very low rotational speeds, which occur at least at the beginning of cold starting of the internal combustion engine 1, it takes a certain time period until this information is available. If the rotational speed is additionally determined in this time period by means of a model, the throttle valve setpoint value TPS_ST can be determined more precisely. Instead of a model rotational speed N_MOD it is also possible to use what is referred to as a drag pointer function for the rotational speed, i.e. once the rotational speed has risen once the highest value is allowed to remain until the rotational speed rises again, and this value is then taken. In other words, the falling branch of the rotational speed signal is not evaluated but rather only the positive branch in the case of rotational speed fluctuations.

In this way, it is therefore possible to stabilize the opening of the throttle valve 8. If the internal combustion engine 1 starts at low temperatures and combustion takes place in the first cylinder, there is a torque, the rotational speed rises and the rotational speed drops again slightly until combustion takes place in the next cylinder, and so on. This generates a type of ripple in the rotational speed signal, and in order to avoid this ripple reflecting the setting of the degree of opening of the throttle valve, the rotational speed signal which is supplied by the sensor is not directly used but instead a modelled value from which the ripple is filtered out.

The further influence variable y for the characteristic diagram KF7 in the function block B7 can be either the coolant temperature TCO or the number of cylinder working cycles CYC. The provision of the individual characteristic diagrams KF1 to KF7 with data and the selection of the limiting value for cylinder working cycles CYC may be carried out by means of trials on the test stand by varying the individual system variables and subsequently executed starting processes.

The teachings herein are explained with reference to an internal combustion engine which has 4 cylinders and which is operated with pure ethanol (E100) or a mixed fuel which contains a relatively high ethanol content (e.g. E85). However, they can also be used for internal combustion engines with other numbers of cylinders and for internal combustion engines which, instead of ethanol, are operated with other fuels which have a high boiling point and low vapor pressure, such as, for example, methanol. Furthermore, there may be two inlet ducts per cylinder and for a fuel injector to be arranged in each of the two ducts, as described, for example, in DE 10 2012 206 882 A1.

LIST OF REFERENCES

1 Internal combustion engine
2 Intake tract
3 Cylinder head
4 Exhaust tract
5 Air filter
7 Throttle valve block
8 Throttle valve
9 Collector
10 Common intake manifold
11 Fuel supply device
12 Fuel tank
13 Electric fuel pump
14 Fuel filter
15 Fuel line
16 Electronic control device
17 Accelerator pedal position encoder
18 Accelerator pedal
19 Sensor module for temperature and pressure in the intake tract
20 Crankshaft angle sensor
21 Coolant temperature sensor
22 Computational unit, processor
23 Program memory
24 Value memory, data memory
30 Starting device
31 Fuel injector
32 Camshaft sensor
33 Ambient pressure sensor
34, 35 Cycle counter
AMP Ambient pressure
AS Output signals, actuation signals
B1 . . . B7 Function block
CYC_1 Number of cylinder working cycles since the starting device is energized
CYC_2 Number of cylinder working cycles from the time of the first injection
ES Input signals
FKT_MFF_ST Function for determining the fuel injection quantity during the starting
FKT_TPS_ST Function for determining the throttle valve position during the starting
FPW Accelerator pedal value
KF1-KF7 Characteristic diagram
MAP Pressure in the intake tract, intake manifold pressure
MFF_ST Fuel mass
MFF_ST_FAC_DEAC Correction factor
MFF_ST_FAC_MAP Correction factor
MFF_ST_FAC_CYC) Correction factor
M1-M5 Multiplication point
N Rotational speed of the internal combustion engine
N_MOD Modelled rotational speed
Ph1-Ph4 Phases of the starting process
TAM Intake air temperature
TCO Coolant temperature
TIA Temperature in the intake tract
TPS_ST Degree of opening of the throttle valve
t0 Time of starting process
t1-t4 Times
Z1-Z4 Cylinders of the internal combustion engine

What is claimed is:

1. A device for starting an internal combustion engine configured for operation with alcohol or alcohol/gasoline mixed fuels, wherein the internal combustion engine includes an intake tract and a throttle valve arranged in the intake tract to set a combustion air, the device comprising:
a memory storing a set of instructions; and
a processor configured to execute the set of instructions and thereby:
in a first phase starting immediately after the activation of the starting process of the internal combustion engine, closing the throttle valve so the pressure in the intake tract is lowered to a value below the ambient pressure and inject a fuel mass into the intake tract, wherein the fuel mass is above a rich combustion limit at which the fuel/air mixture would still just be combustible;
in a second phase, reduce the injected fuel mass as a function of the pressure in the intake tract;
in a third phase which is chronologically shorter compared to the second phase, further reduce the injected fuel mass and open the throttle valve to increase the pressure in the intake tract; and
in a fourth phase, increase the injected fuel mass as a function of rising pressure in the intake tract;
wherein the value for the fuel mass depends on a basic value stored in a characteristic diagram as a function of the coolant temperature of the internal combustion engine and the rotational speed of the internal combustion engine and corrected with a correction factor.

2. A method for starting an internal combustion engine configured for operation with alcohol or alcohol/gasoline mixed fuels, wherein the internal combustion engine includes an intake tract with a throttle valve arranged therein to set the combustion air, the method comprising:
in a first phase starting immediately after the activation of the starting process of the internal combustion engine, closing the throttle valve so the pressure in the intake tract is lowered to a value below the ambient pressure and injecting a fuel mass into the intake tract, wherein the fuel mass is above a rich combustion limit at which the fuel/air mixture would still just be combustible;
in a second phase, reducing the injected fuel mass as a function of the pressure in the intake tract;
in a third phase which is chronologically shorter compared to the second phase, further reducing the injected fuel mass and opening of the throttle valve to increase the pressure in the intake tract; and
in a fourth phase, increasing the injected fuel mass as a function of rising pressure in the intake tract;
wherein the value for the fuel mass depends on a basic value stored in a characteristic diagram as a function of the coolant temperature of the internal combustion engine and the rotational speed of the internal combustion engine and corrected with a correction factor.

3. The method as claimed in claim 2, wherein a first correction factor depends on a number of cylinder working cycles since the actuation of the starting process or the number of cylinder working cycles from the time of the first injection at the start and the coolant temperature of the internal combustion engine and is stored in a characteristic diagram.

4. The method as claimed in claim 2, wherein a second correction factor depends on the ambient pressure and the pressure in the intake tract and is stored in a characteristic diagram.

5. The method as claimed in claim 2, wherein a third correction factor depends on the number of cylinder working cycles since the actuation of the starting process or the number of cylinder working cycles from the time of the first injection at the start and the rotational speed of the internal combustion engine and is stored in a characteristic diagram.

6. The method as claimed in claim 2, wherein the value for the degree of opening of the throttle valve depends on a basic value stored in a characteristic diagram as a function of the coolant temperature of the internal combustion engine and the rotational speed of the internal combustion engine and which is corrected with a correction factor.

7. The method as claimed in claim 6, wherein a first correction factor depends on a number of cylinder working cycles since the actuation of the starting process or a number of cylinder working cycles from the time of the first injection at the start and the coolant temperature of the internal combustion engine and is stored in a characteristic diagram.

8. The method as claimed in claim 6, wherein a second correction factor depends on a number of cylinder working cycles since the actuation of the starting process or a number of cylinder working cycles from the time of the first injection at the start, the coolant temperature of the internal combustion engine, and the rotational speed obtained by means of a model, and is stored in a characteristic diagram.

9. The method as claimed in claim 2, wherein a fuel which contains at least 75% ethanol is used as the fuel.

* * * * *